July 19, 1932.  R. V. JUDSON  1,868,237
APPARATUS FOR CLEANING AND LOADING GRAIN
Filed Aug. 20, 1929  2 Sheets-Sheet 1

INVENTOR
*Russell V. Judson*
BY
ATTORNEYS

July 19, 1932.   R. V. JUDSON   1,868,237
APPARATUS FOR CLEANING AND LOADING GRAIN
Filed Aug. 20, 1929    2 Sheets-Sheet 2

INVENTOR
*Russell V. Judson*
BY
ATTORNEYS

Patented July 19, 1932

1,868,237

UNITED STATES PATENT OFFICE

RUSSELL V. JUDSON, OF DETROIT, MICHIGAN

APPARATUS FOR CLEANING AND LOADING GRAIN

Application filed August 20, 1929. Serial No. 387,218.

The present invention pertains to a novel device for cleaning and grading grain, seeds and the like and for elevating and loading the same.

The primary object of the present invention is to provide a machine which will greatly assist in preventing harvested grain crops from spoiling through dampness and heat without causing any extra labor on the part of the farmer and thereby relieving him from unnecessary losses. It is well known that millions of bushels of grain are spoiled annually as a result of dampness causing the grain to heat, the dampness invariably resulting because the grain had not been cleaned and separated from the weed seeds. It is estimated that weed seeds contain approximately 50% moisture while the grain contains approximately 13% and if they are not separated within a period of less than twelve hours the grain will absorb a considerable amount of moisture from the weed seeds and overheating results.

Another object of the present invention is to provide a machine which will clean and separate the mature grain from the weed seeds and immature grain while the grain is being elevated and loaded into box cars for its shipment to granaries. By separating the grain at this stage of the journey the farmer is saved the "dockage" which is the amount discounted from his profit for the immature grain and weed seeds which are separated from the mature grain after it is shipped to the granaries.

Another and still further object of the present invention is to devise a machine capable of accomplishing the above mentioned objects which takes the form of a portable device into which the farmer may conveniently place his grain and when so placed the grain is cleaned and graded. The higher quality or mature grain is separated from the immature grain and weed seeds and is carried by a pneumatic elevator and is discharged into a box car or the like while the immature grain and weed seeds are discharged through suitable outlets so that they may be retained by the farmer for feeding his stock.

Figure 1:
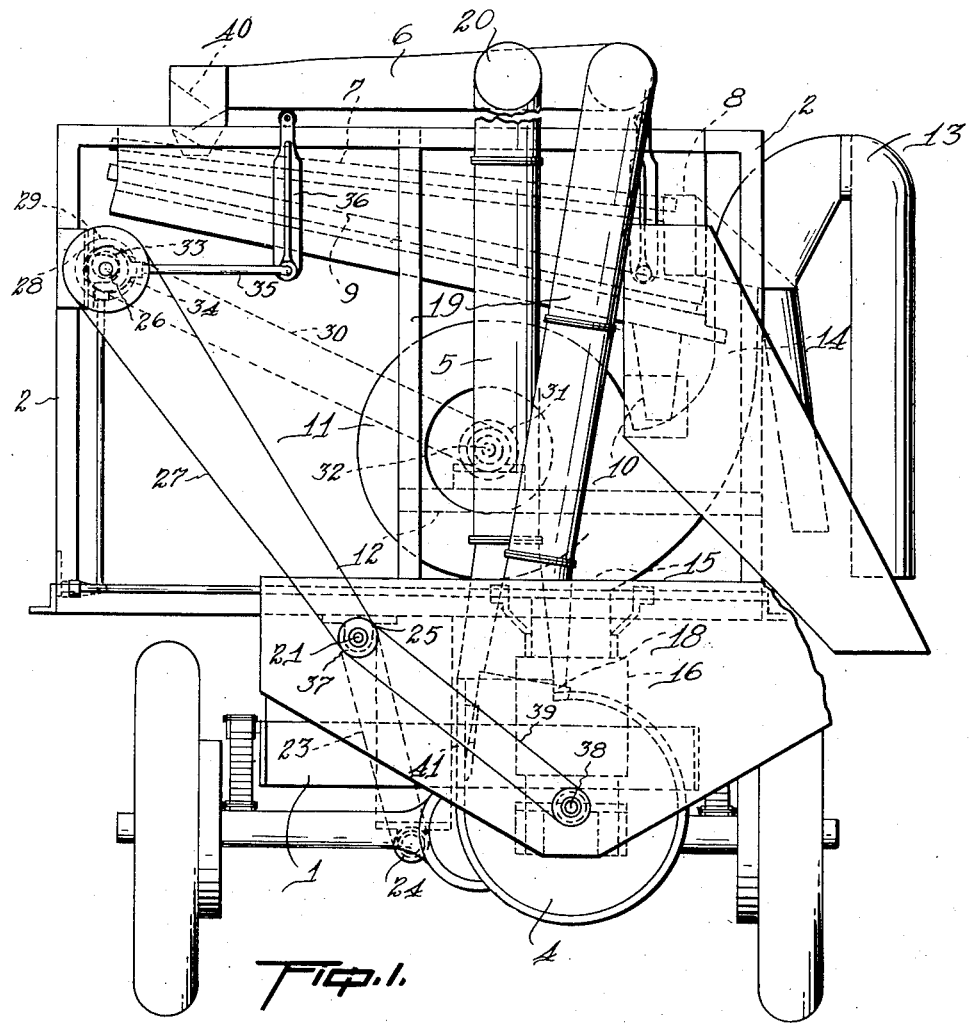
Figure 2:
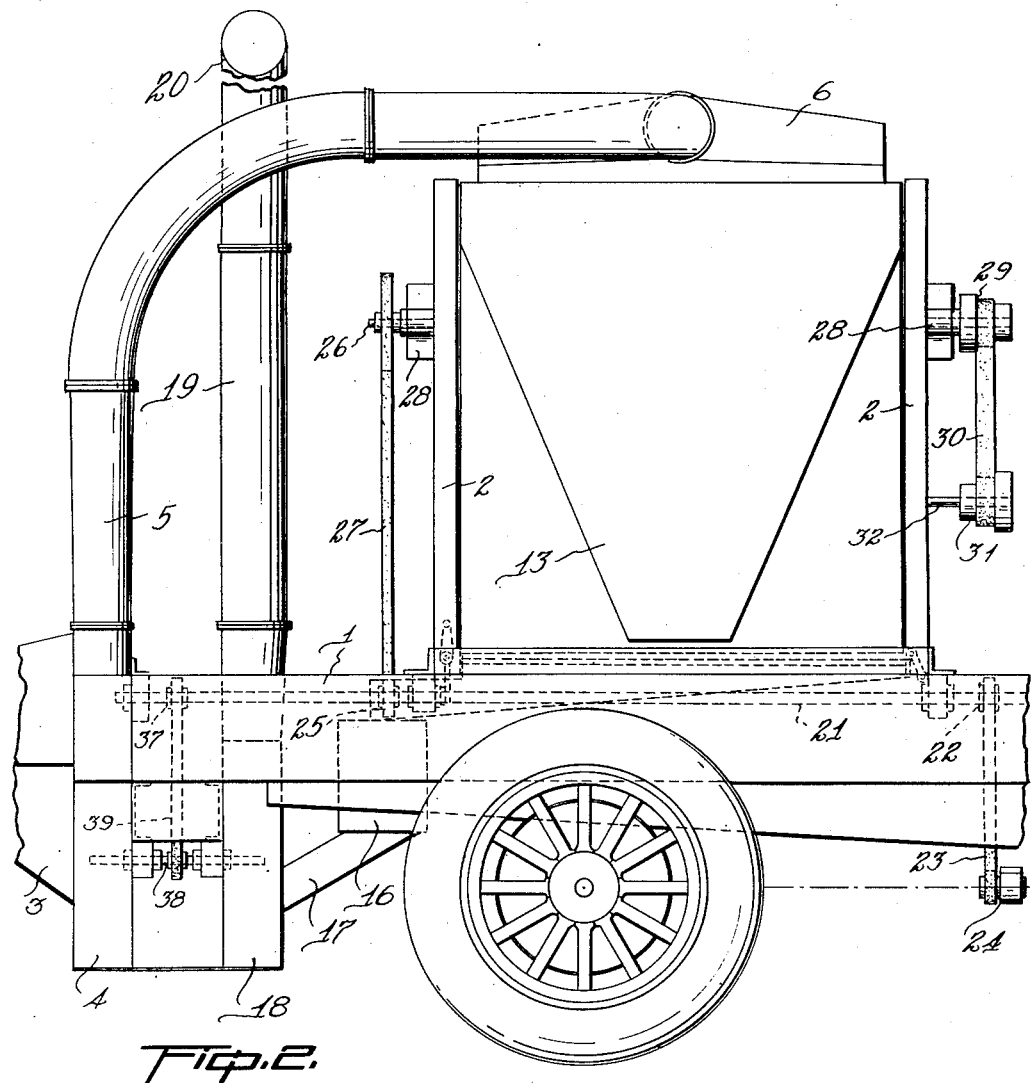

With the above and other ends in view, the present invention consists in the matters hereinafter set forth and more particularly pointed out in the appended claim, reference being had to the accompanying drawings, in which Figure 1 is an end elevation of the present device illustrating it as equipped upon a motor truck by way of example, and Fig. 2 is a side elevation showing a fragment of the motor truck.

Like characters of reference are employed throughout to designate the corresponding parts.

The numeral 1 indicates the frame of a conventional truck having the usual motor and transmission and upon the frame is mounted the uprights 2 for supporting the grain cleaning and separating apparatus of the type shown in my Patent No. 1,522,724. The cleaning and separating apparatus comprises a hopper 3 which is connected to a fan or blower 4 to which is connected a vertical air shaft 5 having a fan shaped discharge member 6.

A screen 7 is supported directly below the member 6 and is sufficiently coarse to permit the good grain to pass through it while the coarse tailings and straw travel by gravity over the screen and are carried off through a suitable discharge outlet 8. A second screen 9 mounted below the screen 7 receives the material for further sifting. The second screen permits the dust, immature grain, weed seeds and sand to fall through and to be discharged through a suitable outlet 10.

A blower or fan 11 is mounted upon the cross member 12 and is connected to a discharge pipe 13 by means of a vertical air shaft 14. The air shaft 14 is provided with an opening to permit the end of the screen 9 to extend into the air current created by the blower 11.

The air shaft 14 is provided with an open lower end 15 discharging into a suitably driven measuring device 16 for registering the number of bushels passing through the opening 16. The lower end of the measuring device is connected by a pipe 17 to a fan or blower 18 having a vertical air shaft 19 provided with a flexible upper end 20.

The driving mechanism for the above enumerated parts comprises a shaft 21 suitably mounted in the frame 1 and equipped with a pulley 22 driven by a belt 23 which in turn is driven by a suitable power take-off 24 in connection with the truck power transmission. It is quite obvious that a separate motor might supply the power to the pulley 22 without necessitating invention if it were found desirable to use the present device separate from the truck.

The shaft 21 is provided with a pulley 25 driving a shaft 26 through the belt 27, the shaft being mounted as at 28 upon the uprights 2 and having the pulleys 29 connected by a belt 30 to the pulleys 31 upon the shaft 32 which drives the blower or fan 11. The shaft 26 is further provided with an eccentric portion 33 surrounded by a bearing 34 having a connecting rod 35 pivotally attached to the screen supporting member 36 for the purpose of vibrating the screens.

A pulley 37 is mounted upon the shaft 21 for the purpose of rotating the shaft 38 by means of the belt 39, the shaft 38 being employed to drive both blowers 4 and 18.

In operation the grain as it comes from the thresher is dumped in the hopper 3 from which it is carried by the fan 4 to the top of the screen 7. The straw and oversized kernels are carried from the screen 7 and discharged out the outlet 8. The grain and weed seeds fall through to the screen 9 and pass off the end thereof into the air shaft 14. The air current caused by the fan 11 carries the immature grain and weed seeds upwardly and discharges them through the pipe 13 while the mature grain falls by gravity through the air current and is thoroughly cleaned. The mature grain passes through the open end 15 of the shaft 14 into the measuring device 16 which will record the exact number of bushels passing therethrough, the latter being of any suitable construction which is upon the market. The mature wheat then continues its course by gravity into the blower 18 from which it is forcefully elevated into the line 20 for the purposes such as loading box cars.

A problem heretofore encountered by devices for similar purposes was the separating weed seeds from the grain when both grain and seeds are of approximately the same diameter, a problem which the present device has admirably surmounted. The weed seeds are invariably of a softer nature than the grain, due to the excess amount of moisture contained by the weed seeds and when the grain and seeds pass through the fan or blower 4 the weed seeds are smashed and flattened by the fan blades. A roughened member such as a screen 41 is attached in the bottom of the vertical air shaft 5 to obstruct the material as it leaves the fan 4 and further smash the weed seeds. In the mouth of the fan shaped discharge member 6 are also placed a series of baffles 40 to further smash the weed seeds as well as to evenly distribute the material upon the screens and owing to the flattened nature of the weed seeds they are readily screened and separated from the grain.

Another use to which the present device may be put with equal satisfaction is that of grinding the grain. After the weed seeds have been separated from the grain as above described the grain may be passed through the device a second time with the fans or blowers rotating at an increased speed and it is found that the device thoroughly cracks and grinds the grain.

The present device is an ideal machine for community service corporations inasmuch as it is portable, thoroughly cleans and separates the grain, and elevates it for loading purposes. It may be used to grind the grain in addition and it may be employed to redeem grain which has already started to spoil by thoroughly aerating it. It is therefore the solution asked for by the Department of Agriculture to the problem of preventing the grain from spoiling en route to the granaries as a result of contact with the destructive weed seeds.

Although a specific embodiment of the present invention has been illustrated and described, it will be understood that changes may be made within the scope of the appended claim without departing from the spirit of the invention and such changes are contemplated.

What I claim is:—

In combination with a hopper and a screen above said hopper, a conduit extending from said hopper to said screen for delivering the entire contents of said hopper to said screen, a blower at the intake end of said conduit for propelling the material through said conduit and for smashing weed seeds while passing grain seeds intact, another screen in said conduit at the outlet side of said blower for obstructing the smashed weed seeds and further smashing the weed seeds; and baffles at the outlet end of said conduit and over the first named screen for further smashing the weed seeds and distributing the grain seeds over the first named screen.

In testimony whereof I affix my signature.

RUSSELL V. JUDSON.